United States Patent
Chan et al.

(10) Patent No.: US 6,711,631 B1
(45) Date of Patent: *Mar. 23, 2004

(54) LOW POWER CD-ROM PLAYER WITH CD-ROM SUBSYSTEM FOR PORTABLE COMPUTER CAPABLE OF PLAYING AUDIO CDS WITHOUT SUPPLY ENERGY TO CPU

(75) Inventors: Reginia Chan, Fremont, CA (US); Sterling Du, Palo Alto, CA (US); James Lam, Fremont, CA (US); Aaron Reynoso, San Jose, CA (US)

(73) Assignee: O2Micro International Limited, Cayman Islands (KY)

( * ) Notice: Subject to any disclaimer, the term of this patent is extended or adjusted under 35 U.S.C. 154(b) by 420 days.

This patent is subject to a terminal disclaimer.

(21) Appl. No.: 09/595,103

(22) Filed: Jun. 16, 2000

Related U.S. Application Data

(63) Continuation of application No. 09/136,207, filed on Aug. 19, 1998, now Pat. No. 6,226,237.
(60) Provisional application No. 60/079,508, filed on Mar. 26, 1998.

(51) Int. Cl.[7] .......................... G06F 13/00; G11B 17/22
(52) U.S. Cl. ............................. 710/14; 710/17; 710/19; 710/131; 710/260; 710/266; 713/310; 713/320; 713/323; 713/324
(58) Field of Search ........................... 710/14, 19, 260, 710/17, 131, 266; 713/324, 320, 323, 310; 369/30.26, 2

(56) References Cited

U.S. PATENT DOCUMENTS

| | | | |
|---|---|---|---|
| 5,548,777 A | 8/1996 | Woo | 710/1 |
| 5,796,705 A | 8/1998 | Kim | 710/62 |
| 5,815,679 A | 9/1998 | Liu | 710/311 |
| 5,822,598 A | 10/1998 | Lam | 713/324 |
| 5,838,983 A | 11/1998 | Atkinson | 713/322 |
| 5,870,355 A | 2/1999 | Fujihara | 369/30.26 |
| 5,910,933 A | 6/1999 | Moore | 369/2 |
| 6,006,285 A | 12/1999 | Jacobs et al. | 710/14 |
| 6,006,337 A | * 12/1999 | Koo | 713/324 |
| 6,076,133 A | 6/2000 | Brainard et al. | 710/260 |
| 6,088,809 A | 7/2000 | Atkinson | 713/324 |
| 6,195,713 B1 | 2/2001 | Chaiken et al. | 710/19 |
| 6,226,237 B1 | 5/2001 | Chan et al. | 369/33 |
| 6,252,511 B1 | * 6/2001 | Mondshine et al. | 340/636.1 |
| 6,266,714 B1 | 7/2001 | Jacobs et al. | 710/14 |
| 6,378,077 B1 | 4/2002 | Atkinson | 713/324 |
| 6,412,075 B1 | * 6/2002 | Klein | 713/322 |

FOREIGN PATENT DOCUMENTS

| | | | |
|---|---|---|---|
| EP | 0 825 519 A1 | 2/1998 | 1/26 |
| JP | 09-101848 | 4/1997 | G06F/1/32 |
| WO | WO 96/38841 | 12/1996 | G11B/19/02 |

* cited by examiner

*Primary Examiner*—Kim Huynh
*Assistant Examiner*—Tammara Peyton
(74) *Attorney, Agent, or Firm*—Grossman Tucker Perreault & Pfleger, PLLC

(57) ABSTRACT

A computer subsystem of a computer includes a CPU, RAM, display, storage device, input device(s), and a digital-audio generating IC. A CD-ROM subsystem of the computer includes a CD-ROM drive and CD-ROM control buttons for controlling CD-ROM drivers operation while playing audio CDs. An audio-interface IC of the CD-ROM subsystem couples a bus of the computer subsystem to the CD-ROM drive, and to the control buttons. The audio-interface IC, in one operating mode, relays commands and data between the bus and the CD-ROM drive. A second operating mode permits turning the computer subsystem off while the audio-interface IC autonomously responds to the control buttons and transmits commands to the CD-ROM drive for playing an audio CD.

18 Claims, 5 Drawing Sheets

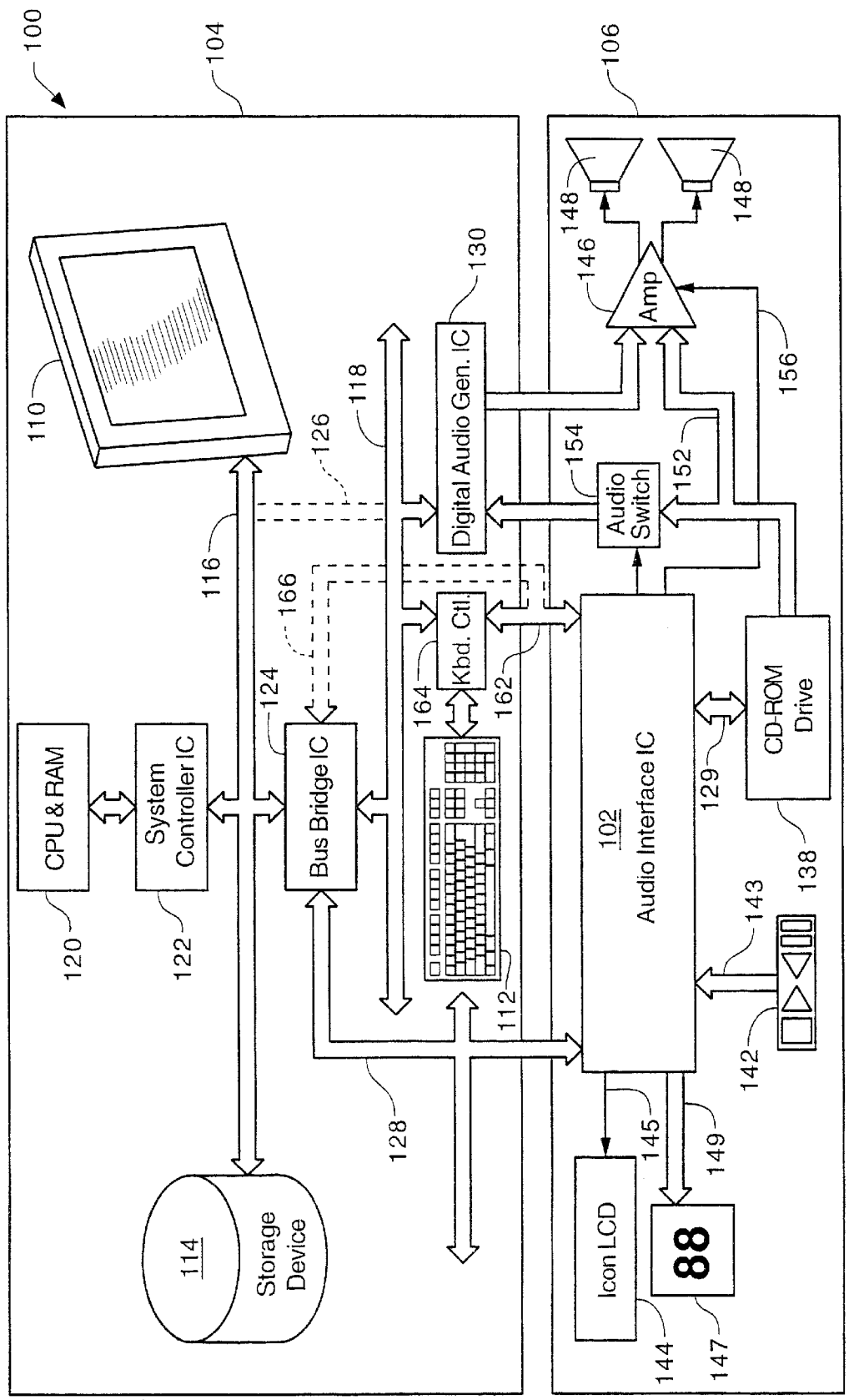
FIG._1

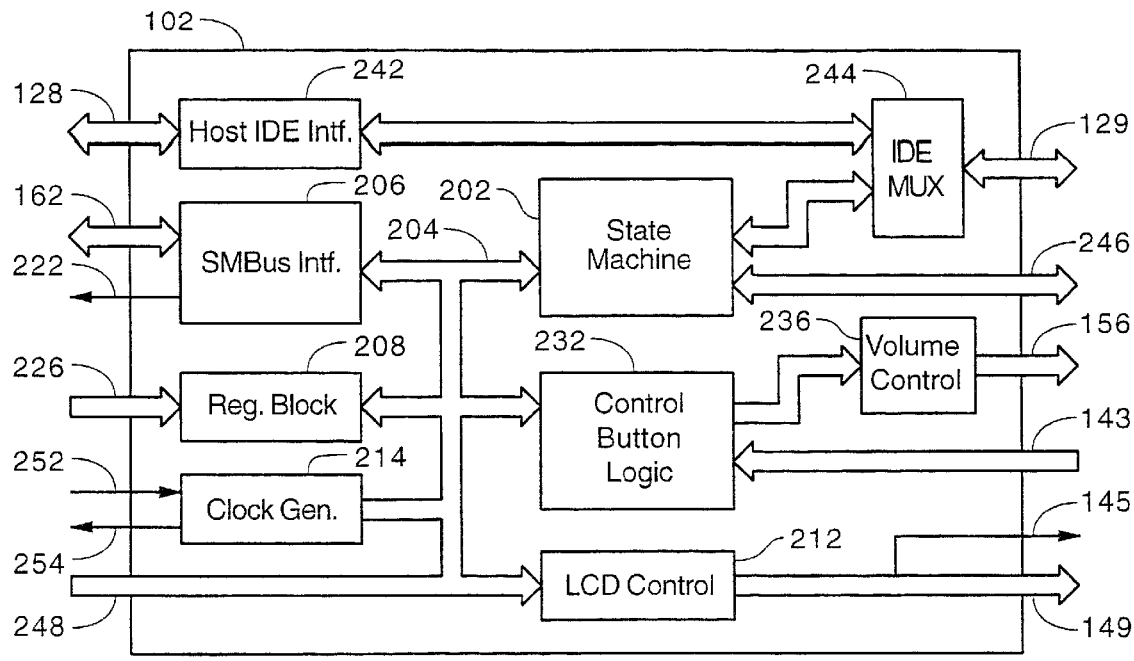
FIG._2
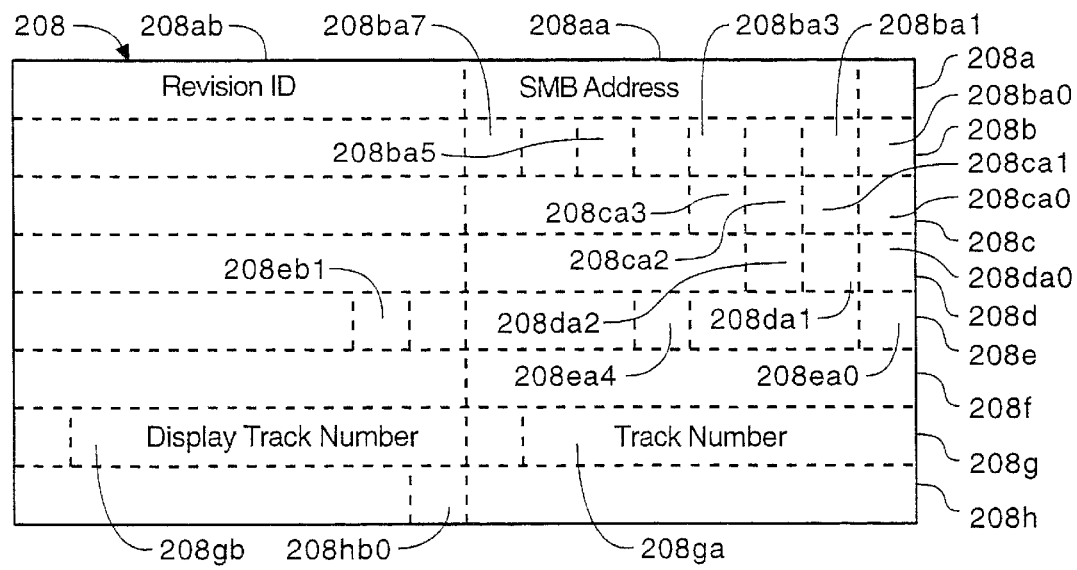
FIG._3

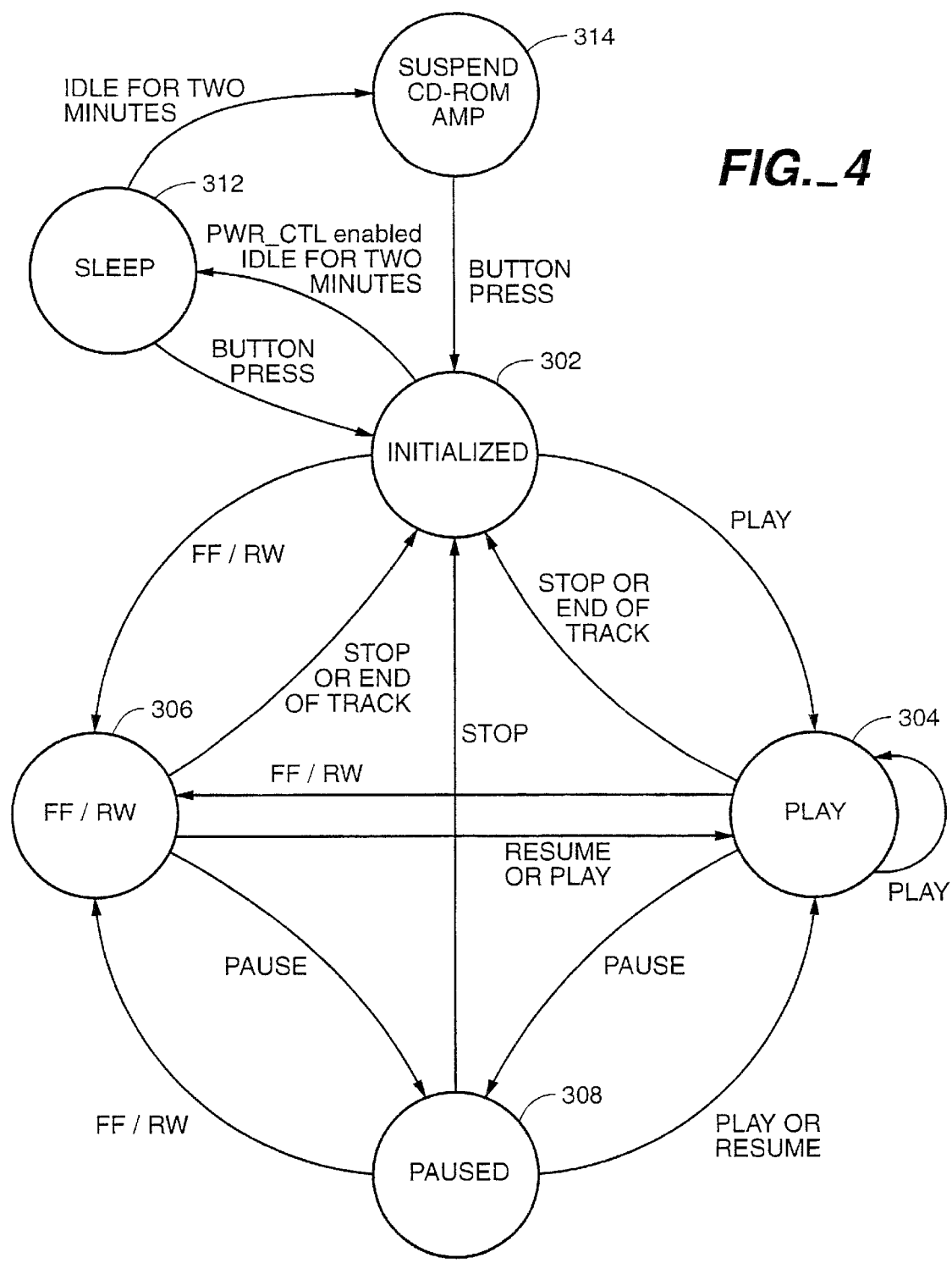
FIG._4

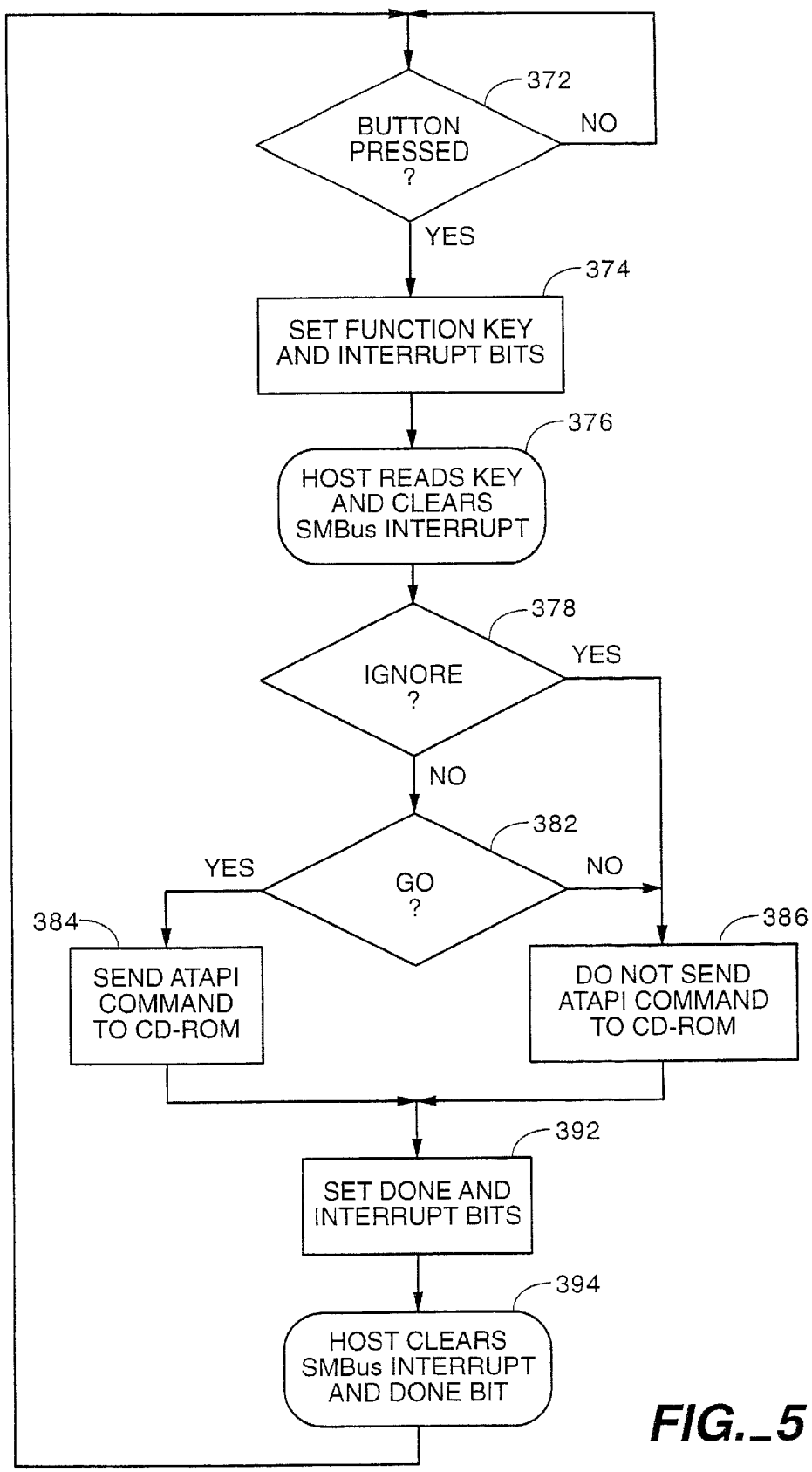
FIG._5

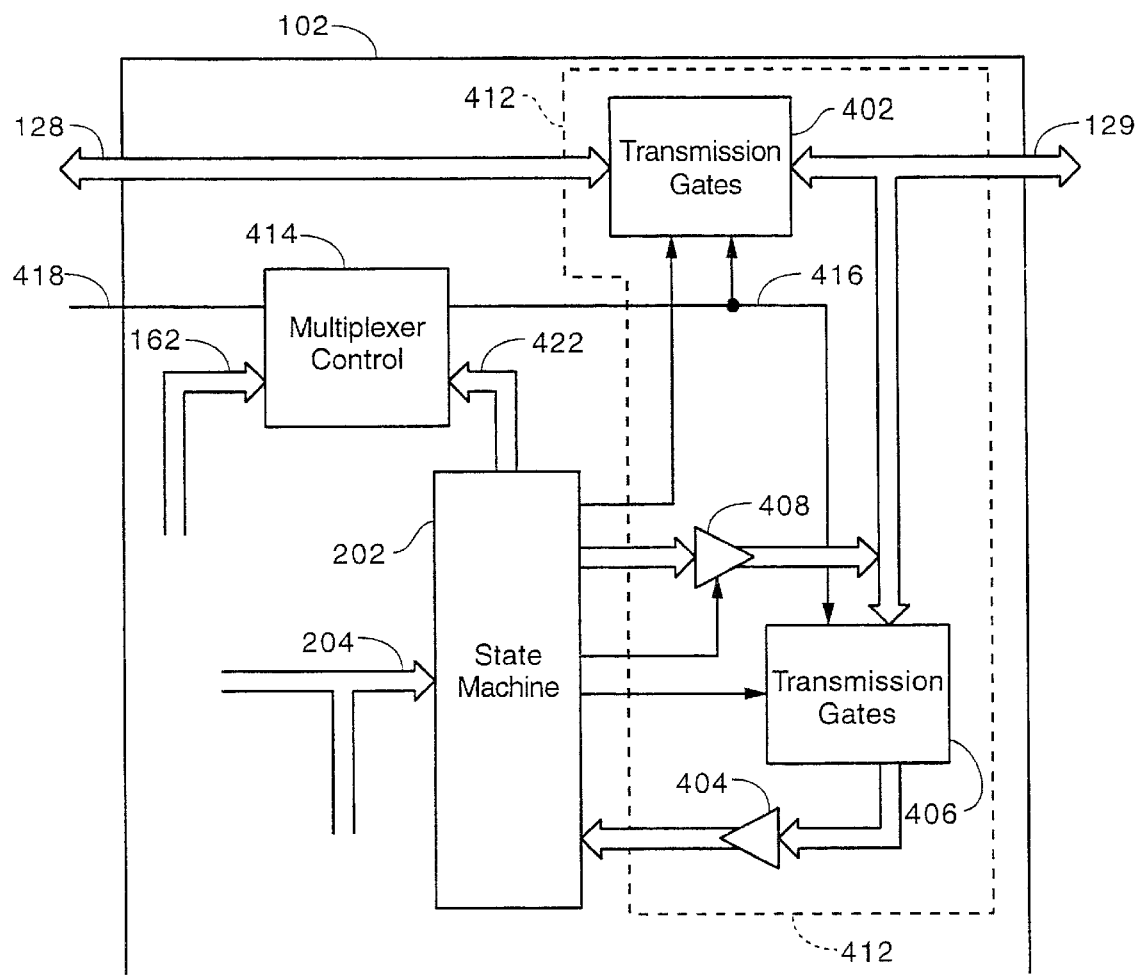
FIG._6

LOW POWER CD-ROM PLAYER WITH CD-ROM SUBSYSTEM FOR PORTABLE COMPUTER CAPABLE OF PLAYING AUDIO CDS WITHOUT SUPPLY ENERGY TO CPU

CLAIM OF PROVISIONAL APPLICATION RIGHTS

This application is a continuation application under 37 C.F.R §1.53(b) of application Ser. No. 09/136,207, filed Aug. 19, 1998 now U.S. Pat. No. 6,226,237, and claims the benefit of United States Provisional Patent Application No. 60/079,508 filed on Mar. 26, 1998.

BACKGROUND OF THE INVENTION

1. Field of the Invention

The present invention relates generally to digital computers and, more particularly, to a digital computer adapted for low power operation while playing a CD-ROM.

2. Description of the Prior Art

Portable computers (i.e., notebook, laptop, palmtop and the like) from major original equipment manufacturers such as Toshiba, Compaq, Dell, IBM and others offer CD-ROM drives as either standard or optional devices. Notebook, laptop, palmtop computers are aimed at the mobile computer user who needs or wants to take work home from the office or on a business trip. An added benefit of CD-ROM equipped portable computers is the opportunity to enjoy periods of relaxation and pleasure by playing audio tracks from standard music CDs. In the ensuing discussion, the term notebook computer will be understood to apply also to laptop, palmtop and other portable, battery powered computers.

The Windows operating system's media player or third party audio application can play back standard audio CDs on a portable computer. However the simple function of playing an integral audio CD-ROM requires that the entire notebook system be powered for the duration of the audio play back. This causes excessive drain on the notebook's battery power system, unnecessarily consuming battery energy better saved for CPU intensive use such as word processing and spreadsheet analysis.

Conventional laptop and notebook computers typically have several power down modes. They can be powered down such that the CPU is almost completely off, with the state of the CPU saved on a hard drive. A very low power portion of the CPU or an auxiliary circuit (e.g. keyboard controller) is typically used to recognize when a key is pressed. The system then reactivates normal power to allow the CPU to retrieve the stored machine state from the hard drive thereby restoring the computer into an operating mode. Some well known power saving modes are called sleep mode, suspend mode and the like.

Consequently, a modem energy efficient computer will, over time, operate in several different power management regimes. For example, if a portable computer is being used in an office environment where electrical power consumption is an insignificant concern, then the computer user may want the computer to provide the highest performance and availability possible. Conversely, if the computer is being operated on battery power where there is no convenient source of electrical energy, then the computer user may want to choose a power management regime for the computer that will maximize the time the computer operates without recharging its batteries, even though performance and availability may be noticeably reduced.

To facilitate controlling electrical power consumption in personal computers, Intel Corporation, Microsoft Corporation, and Toshiba Corporation have jointly established an Advanced Configuration and Power Interface Specification ("ACPI Specification"). The ACPI Specification Revision 1.0 of Dec. 22, 1996, Copyright 1996 Intel Corporation, Microsoft Corporation, Toshiba Corporation, establishes both a set of five (5) Global System States G3-Mechanical Off, G2/S5—Soft Off, G1—Sleeping, G0—Working, S4—Non-Volatile Sleep, and a set of four (4) Device Power States D0—Fully On, through D3—Off. The ACPI Specification defines the Global System States as follows.

G3 Electrical power is mechanically turned off.

G2/S5 Electrical power is turned on but the computer consumes a minimal amount of power by not executing either user or system computer programs, and the system's context is not preserved by hardware.

G1 Electrical power is turned on, the system's context is preserved by hardware or system software, but user computer programs are not being executed.

G0 Electrical power is turned on and user computer programs are executed. In the G0 state, devices such as hard disk drives, CD-ROM drives, floppy diskette drives, etc are dynamically turned on and off as needed.

S4 Electrical power may either be turned off, i.e. Global State G3, or turned on with the computer consuming a minimal amount of power, i.e. Global State G2/S5, while system context is preserved in a non-volatile storage file before entering either the G3 or G2/S5 state, thereby permitting the computer to be restored to its prior operating state, i.e. G1 or G0.

The ACPI Specification further defines Device Power States as follows.

D0 The device is completely active and responsive, and consumes the most electrical power.

D1 A lower power state that is defined for different types of devices which preserves more device context than the yet lower power state D2.

D2 An even lower power state than D1 that is again defined f or different types of devices, and which preserves less device context than state D1.

D3 Electrical power is fully removed from the device, device context is lost, and system software must reinitialize the device when it is turned on again.

The different computer operating modes and associated power management regimes described above are each characterized by a unique power demand (i.e., current drain) from the battery power supply. This is an important feature both in design of portable computer systems, and in marketing them as well. Great attention is focused on minimizing the power demand for each of the different Global and Device operating modes. Thus, the power demand characterizing each power management regime is a critical factor to be considered for portable computers, particularly one that includes a CD-ROM drive for playing audio CDs.

In implementing conventional computer power management strategies, a power management routine ("PMR") executed by the CPU must periodically monitor peripheral devices to assess whether a peripheral device's operation may be suspended. Similarly, if it becomes necessary to access a peripheral device whose operation has been suspended such as in Device Power modes D1–D3, the PMR must resume that peripheral device's operation. Generally, suspending the operation of a peripheral device and resuming its operation respectively require that the PMR executed by the CPU perform a unique sequence of operations in turning off electrical power to a peripheral device, and in turning electrical power back on. Writing a computer program that detects a need to execute a power-on or a power-off sequence of operations for a peripheral device is a cumbersome task.

Previous portable computers that include a CD-ROM use PMR functions to minimize battery drain. However, if CPU operation has been suspended to save electrical power, the computer can essentially do nothing. Therefore, in the minimal power drain mode, the CPU cannot use the windows operating system's media player or third party audio application to play audio CDs.

A significant power drain in portable computers occurs in the conventional LCD monitor. Typically, 60 to 70% of the power consumed by a notebook is consumed by the display. Thus even if a computer's devices, including even perhaps the CPU, were in a lower power state, i.e., one of the lower Device Power States D1–D3 for power savings during CD-ROM play only, the need to use the normal LCD to display CD-ROM status and the music playing status would itself impede significantly reducing power consumption.

For the reasons described above, it is apparent that a disadvantage of present portable computers for playing audio CDs is that some portion of the computer system must remain energized state to detect key actuation and then to restore power or activate a power restore function of the CPU and associated peripherals (e.g. hard drive, keyboard controller, display, etc.). At times when a portable computer is being used during travel, or when line power is otherwise unavailable, the user may wish to play some audio CDs. Given the limited battery life of most portables, e.g., 3 to 5 hours of use, the user may have to choose to forego using the CD-ROM capability for very long, out of fear that the notebook will not be functional for needed work or communication.

BRIEF SUMMARY OF THE INVENTION

The present invention extends the playing time for a CD-ROM equipped notebook computer while minimizing the loss of potential operating time as a computer.

Another advantage is to select and control the music being played without engaging (powering on) the CPU or other notebook peripherals, i.e., hard drive, display, memory and the like.

Another advantage is to extend playing time and lower power drain while minimizing the requirements for additional software drivers.

Another advantage would be to provide CD-ROM/music status to the user without using the normal display screen with its typically high battery drain requirements.

Another advantage of the present invention is that it facilitates portable computer product differentiation by providing various different audio CD playing user interfaces.

Another advantage of the present invention is that it permits designers of portable computer systems to choose among various different audio CD playing user interfaces.

Another advantage of the present invention is that all of the preceding advantages may be obtained merely by inserting an IC in accordance with the present invention into an existing portable computer design.

In one embodiment the present invention is a digital computer that includes both a computer subsystem and a CD-ROM subsystem. The computer subsystem is conventional and includes a digital computer bus via which various digital computer devices included in the computer subsystem exchange commands and data. Devices included in the computer subsystem include a central processing unit ("CPU"), a random access memory ("RAM"), a display, a read-write mass storage device, a manual input device, and a digital-audio generating integrated circuit ("IC").

The CD-ROM subsystem includes a conventional CD-ROM drive and an audio output amplifier that is coupled to the CD-ROM drive for receiving an analog audio signal from the CD-ROM drive. The CD-ROM subsystem also includes several CD-ROM control buttons for controlling operation of the CD-ROM drive during replay of audio compact disks ("CDs"). An audio-interface IC, also included in the CD-ROM subsystem, is coupled to the digital computer bus of the computer subsystem, to the CD-ROM drive, and to the CD-ROM control buttons. The audio-interface IC, in a first operating mode in which the computer subsystem is energized and operating, relays commands and data between the digital computer bus of the computer subsystem and the CD-ROM drive. In a second operating mode in which the computer subsystem is not energized and is inoperative, the audio-interface IC autonomously responds to signals received from the CD-ROM control buttons and transmits commands to the CD-ROM drive which cause the CD-ROM drive to play an audio CD present in the CD-ROM drive.

In a particularly preferred embodiment the present invention the audio-interface IC has a third operating mode in addition to the two described above. In this third operating mode the computer subsystem is energized and operating, and the audio-interface IC receives commands from the CD-ROM control buttons and stores such commands for subsequent retrieval by a computer program executed by the CPU included in said computer subsystem. Furthermore, in this third operating mode, as directed by a computer program executed by the CPU, the audio-interface IC either merely relays commands and data between the computer subsystem's digital computer bus and the CD-ROM drive, or independently responds to CD-ROM button commands by generating CD-ROM commands internally, and independently transmitting such commands to the CD-ROM drive to control playing an audio CD present in the CD-ROM drive.

An advantage of the present invention is that during playing of audio CDs the invention can double the interval during which the digital computer can operate on a particular amount of battery power.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a block diagram depicting a digital computer in accordance with the present invention having both a computer subsystem and a CD-ROM subsystem that includes an audio-interface IC;

FIG. 2 is a block diagram depicting an audio-interface IC in accordance with the present invention;

FIG. 3 is a register diagram depicting contents of a register block included in the audio-interface IC illustrated in FIG. 2;

FIG. 4 is a state diagram depicting operation of the audio-interface IC illustrated in FIG. 2 if the computer subsystem is not energized and is inoperative;

FIG. 5 is a flow diagram depicting operation of the computer together with the audio-interface IC illustrated in FIG. 2 when the computer subsystem is energized and the audio-interface IC operates in the third operating mode; and FIG. 6 is a block diagram depicting a circuit preferably included in the audio-interface IC for interfacing between a bus included in the computer subsystem of the digital computer and a CD-ROM drive.

DETAILED DESCRIPTION

FIG. 1, depicts a system block diagram of an exemplary battery-powered portable computer 100 adapted for reading digital computer data from a compact disk—read only memory ("CD-ROM"), and for playing audio CDs. For purposes of playing audio CDs and power management, the computer 100 is functionally partitioned into a computer subsystem 104 and a CD-ROM subsystem 106.

The Computer Subsystem 104

The computer subsystem 104 includes all conventional data-processing components such as a microprocessor-based central processing unit and random access memory ("RAM") system ("CPU system") 120 together with various ICs described in greater detail below. The computer 100 also conventionally includes a display 110 (TFT LCD matrix display, CRT and the like), manual input devices 112 (e.g. keyboard, mouse, touch-pad), and read-write mass storage device 114 (e.g. hard drives, floppy drives, optical drives and the like), which operate conventionally within the computer 100.

The computer subsystem 104 includes associated input/output ("I/O") buses (e.g. PCI bus 116, and ISA bus 118) for interconnecting various subsystems included in the computer 100. In the computer 100, the CPU 120 (e.g. a Pentium microprocessor) exchanges data with the PCI bus 116 through a system controller IC 122 (e.g. Intel 82439HX known as the "Northbridge") for controlling on-board L2 cache. The system controller IC 122 is described in a document, a copy of which may be retrieved from http://developer.intel.com/design/intarch/TOP_800.HTM, that is hereby incorporated by reference. Via suitable adapter devices, conventionally the PCI bus 116 permits the CPU 120 to exchange data with higher performance devices such as the display 110 and the read-write mass storage device 114.

A bus bridge IC 124 (e.g. a 82371SB "Southbridge" IC) interconnects the PCI bus 116 with the ISA bus 118 and with an IDE bus 128. A description of the bus bridge IC 124 can be obtained from http://developer.intel.com/design/intarch/embdmodl.htm and is hereby incorporated by reference. The bus bridge IC 124 is available from Intel Corp., Santa Clara, Calif. Via suitable adapter devices, conventionally the ISA bus 118 permits the CPU 120 to exchange data with lower speed devices such as the manual input devices 112. However, for particular configurations of the computer 100, the CPU 120 may exchange data with higher performance devices, such as the read-write mass storage device 114, via the ISA bus 118, or directly via the IDE bus 128.

A digital-audio generation IC 130 included in the computer subsystem 104 communicates with the CPU 120 either via the ISA bus 118, or via the PCI bus 116 as indicated by a pair of dashed lines 126. The digital-audio generation IC 130 is conventional and may be either a Maestro-1™ or Maestro-2™ marketed by ESS Technology, Inc. of Fremont, Calif.

As is well known to those skilled in the art, the computer programs executed by the microprocessor included in the CPU 120 of a laptop or notebook computer 100 usually include Power Management Routines (PMRs). Under appropriate operating conditions, the PMRs may place the computer 100 into one of the several power management operating modes such as those described previously for the ACPI Specification. Computer programs that place the computer 100 into one of the various power management operating modes may be prepared by one having ordinary skill in the art, and form no part of the present invention. Each of the various power management operating modes is characterized by a corresponding battery power requirement. For example, the current demand for the ACPI Specification's Device Power States may be those set forth below.

| Device Power State | Battery Power Required |
|---|---|
| D0 - Fully On | Ir1 |
| D1 | Ir2 < Ir1 |
| D2 | Ir3 < Ir2 |
| D3 - Off | Ir4 < Ir3 |

The CD-ROM Subsystem 106

The CD-ROM subsystem 106 includes an audio-interface IC 102 in accordance with the present invention, a CD-ROM drive 138, CD-ROM control buttons 142, an icon liquid crystal display ("LCD") 144, a track-number display 147, an audio output amplifier 146, and audio output transducer 148, e.g. speakers or headphones. The CD-ROM control buttons 142, which connect to audio-interface IC 102 via a control-button bus 143, include buttons for playing or pausing an audio CD, for fast-forwarding the audio CD, for rewinding the audio CD, and for stopping or ejecting the audio DC. Thus, the CD-ROM control buttons 142 permit a user of the computer 100 to completely control operation of the CD-ROM drive 138 while playing an audio CD. The CD-ROM drive 138 is a conventional CD-ROM drive capable of operating with conventional ATAPI interface commands provided through an IDE-bus extension 129 which originates at the audio-interface IC 102. The CD-ROM subsystem 106 also includes an audio signals bus 152 that supplies left and right channel stereo audio signals directly to the audio output amplifier 146.

Depending upon the operating mode of the computer 100, an audio switch 154, which operates in response to control signals received from the audio-interface IC 102, may couple the left and right channel stereo audio signals to the digital-audio generation IC 130 included in the computer subsystem 104. When the computer subsystem 104 is not energized, to reduce electrical power consumption caused by leakage electrical currents in ICs included in the computer subsystem 104:

1. the audio switch 154 electrically isolates the audio signals bus 152 from the CD-ROM drive 138; and
2. the audio-interface IC 102 correspondingly electrically isolates itself from the IDE bus 128.

A loudness control-signal line 156 couples a volume control signal from the audio-interface IC 102 to the audio output amplifier 146. As described in greater detail below, the audio-interface IC 102 provides a signal to the icon LCD 144 via a LCD-signal line 145 for indicating that the CD-ROM drive 138 is operating. The audio-interface IC 102 provides signals to the track-number display 147 via a track-number-display bus 149 for displaying a track number as an audio CD is played.

A System Management Bus ("SMBus") 162 permits the audio-interface IC 102 to exchange commands and data with the computer subsystem 104. Within the computer subsystem 104, the SMBus 162 connects to the ISA bus 118 via a keyboard controller IC 164 as indicated in FIG. 1, or the SMBus 162 may connect directly to the bus bridge IC 124, as indicated by a dashed line 166 in FIG. 1.

Both the computer subsystem 104 and the CD-ROM subsystem 106 receive electrical power directly from a battery, not illustrated in any of the FIGS. Depending upon the operating mode of the computer 100 for playing audio CDs, either the CD-ROM subsystem 106 alone, or both the computer subsystem 104 and the CD-ROM subsystem 106 may be energized. If the computer subsystem 104 receives no electrical power, then operation of the CD-ROM drive 138 is effected completely within the CD-ROM subsystem 106 with the audio-interface IC 102 originating signals for controlling operation of the CD-ROM drive 138. If the computer subsystem 104 is energized and operating, then operation of the CD-ROM drive 138 can be effected, via the audio-interface IC 102, by commands received from a computer program executed by the 120.

Interconnections Between The Computer Subsystem 104 and The CD-ROM Subsystem 106

The audio-interface IC 102 exchanges commands and data with a computer program executed by the CPU 120 through the IDE bus 128 and the SMBus 162. The computer subsystem 104 also selectively supplies left and right audio signals from the CD-ROM drive 138 to the digital-audio generation IC 130 depending upon the operating mode of the computer 100. During operation of the computer 100 in which the computer subsystem 104 is energized and operating, the audio-interface IC 102 relays commands and data between the computer subsystem 104 and CD-ROM drive 138. Commands and data which the computer subsystem 104 exchanges with the CD-ROM drive 138 are well known to those skilled in the art.

General Description of The Audio-Interface IC 102

Referring now to a detailed block diagram of the audio-interface IC 102 depicted in FIG. 2, the audio-interface IC 102 includes a state machine 202 which controls overall operation of the audio-interface IC 102. Inclusion of the state machine 202 in the audio-interface IC 102, as contrasted with a programmable controller, provides better performance. The state machine 202 connects via an internal bus 204 to a SMBus interface 206, to a register block 208, to a LCD control 212, and to a clock generator 214.

The SMBus interface 206, which is coupled to the SMBus 162, issues an interrupt signal from an INTN pin 222 whenever a user of the computer 100 presses any of the CD-ROM control buttons 142. The INTN pin 222 may be advantageously connected to a SMBus alert signal-line of the SMBus 162. Upon receiving a SMBus alert signal, a computer program executed by the CPU 120 can interrogate the register block 208 included in the audio-interface IC 102 via the SMBus 162 to determine which of the CD-ROM control buttons 142 has been pressed.

In addition to being coupled to the internal bus 204, the register block 208 is also coupled to an operating-mode bus 226 by which the computer 100 supplies operating mode signals to the audio-interface IC 102 via the operating-mode bus 226 include a reset signal which upon activation causes the audio-interface IC 102 to be reset. The operating-mode bus 226 also supplies a signal to the audio-interface IC 102 that indicates whether the computer subsystem 104 is energized. And, the operating-mode bus 226 supplies a signal to the audio-interface IC 102 which indicates if the device connected to the IDE-bus extension 129 is a CD-ROM drive. Supplying a signal to the audio-interface IC 102 which indicates whether a CD-ROM drive is connected to the IDE-bus extension 129 avoids a requirement that the audio-interface IC 102 first power on and then interrogate a device connected to the IDE-bus extension 129 to determine whether such device is a CD-ROM drive or a hard disk drive. Avoiding this interrogation requirement is particularly advantageous if the computer 100 permits a user to readily interchange a CD-ROM drive for some other device such as a hard disk drive or conversely.

As is readily apparent, the CD-ROM control buttons 142, icon LCD 144 and track-number display 147 of the CD-ROM subsystem 106 provide a user of the computer 100 with a self-contained interface for playing audio CDs. To effect this functionality, the audio-interface IC 102 includes control-button logic 232 that receives electrical signals from the CD-ROM control buttons 142 via the control-button bus 143. In response to such signals, the control-button logic 232 may store data into the register block 208, or it may cause a digital volume control 236 to transmit control signals via the loudness control-signal line 156 to the audio output amplifier 146. Similarly, when the computer subsystem 104 is playing an audio CD the LCD control 212 transmits a signal Via the LCD-signal line 145 to activate an audio playback icon included in the icon LCD 144. And during such audio CD playback the LCD control 212 transmits signals via the track-number-display bus 149 which cause the track-number display 147 to display a number that indicates the current track of an audio CD. As described in greater detail below" data indicating the current track number is present in the register block 208.

When the computer subsystem 104 is energized, a host IDE interface 242 included in the audio-interface IC 102 couples electrical signals between the IDE bus 128 and the IDE-bus extension 129 via an IDE-signals multiplexer 244 included in the audio-interface IC 102. The electrical signals coupled between the IDE bus 128 and the IDE-bus extension 129 effect exchanges of commands and data between a computer program executed by the CPU 120 and the CD-ROM drive 138. However, if only the CD-ROM subsystem 106 is energized, then the state machine 202 exchanges electrical signals with the IDE-bus extension 129 via the IDE-signals multiplexer 244. And as set forth above, if the computer subsystem 104 is not energized the host IDE interface 242 electrically isolates the audio-interface IC 102 from the IDE bus 128 of the computer subsystem 104 to reduce, as much as possible, leakage current flowing from the CD-ROM subsystem 106 into the computer subsystem 104. Set forth below is a table listing commands in accordance with the ATAPI protocol which the state machine 202 may transmit to the CD-ROM drive 138 via the IDE-signals multiplexer 244 and IDE-bus extension 129.

| Command | Opcode |
| --- | --- |
| Pause/Resume | 4Bh |
| Play Audio MSF | 47h |
| Stop | 1Bh |
| Read Table of Contents | 43h |
| Request Sense | 03h |
| Read Sub Channel | 42h |

-continued

| Command | Opcode |
|---|---|
| Test Unit Ready | 00h |
| Lock/Unlock | 1Eh |
| Inquiry | 12h |
| Sleep | E6h |

The state machine 202 also transmits a pair of signals from the audio-interface IC 102 via a mode-control signal bus 246. A mode signal supplied by the state machine 202 to the mode-control signal bus 246 indicates that the audio-interface IC 102 is operating for receiving signals from the CD-ROM control buttons 142. An electrical power control signal supplied by the state machine 202 to the mode-control signal bus 246 indicates either that the CD-ROM drive 138 is or has been recently operating, or that the CD-ROM drive 138 has not been operating recently. This signal may be used within-the CD-ROM subsystem 106 for appropriately controlling the supply of electrical power to the CD-ROM drive 138 and/or the audio output amplifier 146.

During power-on initialization of the computer 100, input signals supplied to the audio-interface IC 102 via the mode-control signal bus 246 respectively select an address for the audio-interface IC 102 on the SMBus 162, and also control whether the state machine 202 transmits the signal for controlling the supply of electrical power to the CD-ROM drive 138 and/or the audio output amplifier 146.

The audio-interface IC 102 also receives a pair of signals via a mode-set signal bus 248 that specify particular hardware characteristics of the CD-ROM subsystem 106. One of these signals specifies which one of two (2) different types of volume control ICs is included in the audio output amplifier 146. The other mode-set signal specifies a particular characteristic for signals transmitted from the audio-interface IC 102 to the track-number display 147 via the track-number-display bus 149.

The clock generator 214 included in the audio-interface IC 102 connects to an oscillator-in signal-line 252 and to an oscillator-our signal-line 254. The oscillator-in and -out signal-lines 252 and 254 connect to an 8 MHz crystal external to the audio-interface IC 102 that is not separately depicted in any of the FIGs.

Register Block 208

FIG. 3 illustrates registers 208a–208h included in the register block 208. Seven high order bits of a low-order byte 208aa of a Chip and Revision ID Register 208a stores a programmable address for the audio-interface IC 102 on the SMBus 162. A high-order byte 208ab of the Chip and Revision ID Register 208a stores a revision number for the audio-interface IC 102.

Respective states stored in software programmable bits 0, 1, 3, and 5 in a low-order byte of a Control-Buttons Change-Register 208b store data indicating pressing of specific CD-ROM control buttons 142. Bit 208ba0 in the stores data indicating that a rewind button has been pressed. Bit 208ba1 stores data indicating that a fast-forward button has been pressed. Bit 208ba3 in the Control-Buttons Change-Register 208b stores data indicating that a stop/eject button has been pressed. And bit 208ba5 in the Control-Buttons Change-Register 208b stores data indicating that a play/pause button has been pressed. Software programmable bit 208hb0 of a high-order byte of an Interrupt Status Register 208h stores data indicating that one of the CD-ROM control buttons 142 has been pressed, and causes the interrupt signal to be transmitted from the audio-interface IC 102 via the INTN pin 222. Because bits oil 1, 3 and 5 in the Control-Buttons Change-Register 208b are software programmable, a computer program executed by the CPU 120 can assign data values, i.e. 0 or 1, to any of them.

A state of bit 208ba7 of the Control-Buttons Change-Register 208b indicates whether the audio-interface IC 102 is enabled for transmitting the ATAPI protocol commands listed above to the CD-ROM drive 138. A state of bit 208ca1 in a low-order byte of an Electrical Power Register 208c enables the audio-interface IC 102 for controlling electrical power to the CD-ROM drive 138 and to the audio output amplifier 146. If bit 208ca1 is enabled, a state of bit 208ca0 in the Electrical Power Register 208c controls the supply of electrical power to the CD-ROM drive 138 and audio output amplifier 146.

Respective states stored in software programmable bits 0, 1 and 2 in a low-order byte of a Command Control Register 208d store data for controlling operation of the audio-interface IC 102 when the computer subsystem 104 is energized. Bit 208da0 in the Command Control Register 208d stores data which controls whether the audio-interface IC 102 is enabled for executing a single instance of a function specified, as described above, by data values that are assigned to bits in the Control-Buttons Change-Register 208b by pressing the CD-ROM control buttons 142. Bit 208da1 stores data which prevents the audio-interface IC 102 from executing any function specified by data values assigned by pressing the CD-ROM control buttons 142 to bits in the Control-Buttons Change-Register 208b. Bit 208da2 stores data which indicates whether the audio-interface IC 102 has executed a single instance of a function specified by data values assigned by pressing the CD-ROM control buttons 142 to bits in the Control-Buttons Change-Register 208b.

A bit 208ea0 in a low-order byte of an Operating Mode Register 208e stores data which specifies a specific operating mode of the CD-ROM subsystem 106, i.e. the third operating mode, to be described in greater detail below. When the audio-interface IC 102 operates in the third operating mode, bit 208ea4 in the operating Mode Register 208e stores data which specifies selection of a particular drive, i.e. a master drive or a slave drive, to receive ATAPI protocol commands from the audio-interface IC 102.

Bit 208eb1 in a high-order byte of the Operating Mode Register 208e controls application of a clock signal to the state machine 202. When the audio-interface IC 102 operates in the mode in which it merely relays data and ATAPI commands between the IDE bus 128 and the IDE-bus extension 129, to conserve energy bit 208eb1 may be set thereby halting application of the clock signal to the state machine 202.

Bits 0–6 of a low-order byte 208ga of a Track Number Register 208g store a track number read from an audio CD while it is being played. Software programmable bits 0–6 of a high-order byte 208gb store a track number displayed on the track-number display 147.

Operating Modes

If the computer subsystem 104 is energized and operating, in one operating mode of the CD-ROM subsystem 106 the audio-interface IC 102 transparently relays commands and data between the IDE bus 128 and the CD-ROM drive 138. FIG. 4 depicts states and state transitions of the audio-interface IC 102 for an operating mode of the computer 100 in which the computer subsystem 104 is not energized and is inoperative. When the computer subsystem 104 is not energized and the CD-ROM subsystem 106 is initially energized, or immediately after the audio-interface IC 102 is reset by a signal received from the operating-mode bus 226, the audio-interface IC 102 enters an initialize state 302 depicted in FIG. 4.

A pressing of the play/pause button when the audio-interface IC 102 is in the initialize state 302 causes the audio-interface IC 102 to transition to a play state 304 in which the audio-interface IC 102 transmits commands in accordance with the ATAPI protocol to the CD-ROM drive 138 that cause the CD-ROM subsystem 106 to play an audio CD. If the audio-interface IC 102 is in the play state 304, then pressing the stop or eject button, or reaching the end of all the audio CD tracks causes the audio-interface IC 102 to re-enter the initialize state 302 and to return to the beginning of the audio CD.

While the CD-ROM subsystem 106 is in the play state 304 playing an audio CD, pressing either the fast-forward or rewind buttons causes the audio-interface IC 102 to enter a fast-forward-or-rewind state 306. In the fast-forward-or-rewind state 306 the audio-interface IC 102 transmits commands to the CD-ROM drive 138 that either fast-forward or rewind the audio CD. If the CD-ROM drive 138 completes the fast-forward or rewind command, or reaches the end or beginning of the audio CD track the audio-interface IC 102 re-enters the initialize state 302. While the CD-ROM subsystem 106 is fast-forwarding or rewinding an audio CD, pressing the play button causes the audio-interface IC 102 to enter the play state 304 and resume playing the audio CD at the beginning of the present track.

While the CD-ROM subsystem 106 is in the play state 304 playing an audio CD or in the fast-forward-or-rewind state 306 fast-forwarding or rewinding an audio CD, pressing the pause button causes the audio-interface IC 102 to enter a pause state 308 which pauses operation of the CD-ROM drive 138. If the audio-interface IC 102 is in the pause state 308, pressing the play button causes the audio-interface IC 102 to enter the play state 304 and resume playing the audio CD at the present location in the track, pressing either the fast-forward or rewind buttons causes the audio-interface IC 102 to enter the pause state 308, and pressing the stop button causes the audio-interface IC 102 to enter the initialize state 302.

If the audio-interface IC 102 is in the initialize state 302, and a signal has been supplied to the audio-interface IC 102 via the mode-set signal bus 248 which enables the state machine 202 for controlling the supply of electrical power to the CD-ROM drive 138 and/or the audio output amplifier 146, and a pre-established two (2) minute interval passes during which none of the CD-ROM control buttons 142 are pressed; then the audio-interface IC 102 enters a sleep state 312. Upon entering the sleep state 312 the audio-interface IC 102 sends an ATAPI protocol sleep command to the CD-ROM drive 138 thereby slowing down a clock included in the CD-ROM drive 138. If the audio-interface IC 102 is in the sleep state 312 and a second, pre-established two (2) minute interval passes during which none of the CD-ROM control buttons 142 are pressed, then the audio-interface IC 102 enters a suspend state 314 in which the audio-interface IC 102 transmits a signal via the mode-control signal bus 246 which indicates that the CD-ROM drive 138 has not been operating recently. Electrical circuitry included in the CD-ROM subsystem 106 may use this signal from the audio-interface IC 102 for removing electrical power from both the CD-ROM drive 138 and from the audio output amplifier 146. If the audio-interface IC 102 is either in the sleep state 312 or in the suspend state 314, then pressing any of the CD-ROM control buttons 142 causes the audio-interface IC 102 to re-enter the initialize state 302.

In addition to the two operating modes described above, the preferred embodiment of the audio-interface IC 102 may be configured to operate a third operating mode. In this third operating mode the computer subsystem 104 is energized and operating, the audio-interface IC 102 receives commands from the CD-ROM control buttons 142, and stores such commands into the Control-Buttons Change-Register 208b for subsequent retrieval by a computer program executed by the CPU 120. The flow diagram of FIG. 5 depicts operation of the computer 100 including the audio-interface IC 102 for playing audio CDs in this third operating mode. Thus as depicted in FIG. 5, in the third operating mode while a user does not press any of the CD-ROM control buttons 142 the state machine 202 loops at decision block 372 waiting for one of the CD-ROM control buttons 142 to be pressed. If any of the CD-ROM control buttons 142 are pressed, the state machine 202 in processing block 374 sets the bit 208hb0 in the Interrupt Status Register 208h thereby causing the SMBus interface 206 to transmit a SMBus interrupt INTN via the INTN pin 222 either to the keyboard controller IC 164, or to the bus bridge IC 124. In addition to transmitting a SMBus interrupt, the state machine 202 in processing block 374 also sets the appropriate bit in the Control-Buttons Change-Register 208b to indicate which of the CD-ROM control buttons 142 has been pressed. The computer program executed by the CPU 120 in processing block 376 responds to receipt of the INTN interrupt by reading the contents of the Control-Buttons Change-Register 208b, and by then transmitting data to the CPU 120 via the SMBus 162 that resets the bit 208hb0 of the Interrupt Status Register 208h thereby clearing the INTN interrupt.

After the computer program executed by the CPU 120 clears the INTN interrupt, the state machine 202 in decision block 378 determines whether the computer program executed by the CPU 120 has previously set bit 208da1 in the Command Control Register 208d. If bit 208da1 is not set, then the state machine 202 in decision block 382 determines whether the computer program executed by the CPU 120 has previously set bit 208da0 in the Command Control Register 208d. If bit 208da0 is set, then the state machine 202 in processing block 384 transmits to the CD-ROM drive 138 via the IDE-bus extension 129 the ATAPI command(s) which cause the IDE bus 128 to respond appropriately to the pressing of the CD-ROM control button 142. If bit 208da1 has been set, and bit 208da0 has not been set, then the state machine 202 merely passes through processing block 386 without sending any commands to the CD-ROM drive 138.

After performing either processing block 384 or processing block 386, the state machine 202 in processing block 392 again sets bit 208hb0 in the Interrupt Status Register 208h thereby again causing the SMBus interface 206 to transmit a SMBus interrupt via the INTN pin 222 either to the keyboard controller IC 164, or to the bus bridge IC 124. As before, the computer program executed by the CPU 120 in processing block 394 responds to receipt of the INTN interrupt by transmitting data to the CPU 120 via the SMBus 162 that resets bit 208hb0 of the Interrupt Status Register 208h thereby clearing the INTN interrupt. After the computer program executed by the CPU 120 resets bit 208hb0, the state machine 202 returns to decision block 372 to resume waiting for one of the CD-ROM control buttons 142 to be pressed.

FIG. 6 depicts a preferred circuit for interfacing between the IDE bus 128, the IDE-bus extension 129 and the audio-interface IC 102. While the host IDE interface 242 and the IDE-signals multiplexer 244 of the audio-interface IC 102 may employ conventional IC I/O buffers, such conventional circuits will appreciably delay signals passing through the audio-interface IC 102 between the IDE bus 128 and the IDE-bus extension 129. Rather than employing conventional IC I/O buffer circuits for the host IDE interface 242 and the IDE-signals multiplexer 244, the preferred circuit depicted in FIG. 6 employs transmission gates 402 interposed between the IDE bus 128 and the IDE-bus extension 129 for selectively either coupling them together, or isolating them from each other. Use of the transmission gates 402 rather than conventional IC I/O buffers significantly reduces delay for signals passing through the audio-interface IC 102 between the IDE bus 128 and the IDE-bus extension 129.

Analogously to the transmission gates 402, signals that the state machine 202 receives from the IDE-bus extension 129 are also selectively coupled to or isolated from input buffers 404 for the state machine 202 by a transmission gates 406 also in response to a signal generated by the state machine 202. Alternatively, signals that the state machine 202 transmits to the IDE-bus extension 129 pass through output drivers 408 when the output drivers 408 are enabled by a control signal supplied by the state machine 202. This preferred configuration for exchanging signals between the state machine 202 and the IDE-bus extension 129 also permits isolating the state machine 202 from input signals on the IDE-bus extension 129 during certain critical events such as when the CD-ROM drive 138 is removed to be replaced by another device that is to be coupled to the IDE bus 128 without removing electrical power from the computer subsystem 104 and CD-ROM subsystem 106.

The transmission gates 402, input buffers 404, transmission gates 406, and output drivers 408 collectively constitute an analog multiplexer that, in the illustration of FIG. 6, is enclosed within a dashed line 412. Enabling operation of the analog multiplexer 412 permits exchanging signals between the IDE-bus extension 129 and either the IDE bus 128 or state machine 202. Disabling operation of the analog multiplexer 412 isolates the IDE-bus extension 129 both from the IDE bus 128 and from the state machine 202. Inclusion of the analog multiplexer 412 in the audio-interface IC 102 permits various IDE devices, such as the CD-ROM drive 138, a hard disk, a Digital Video Disk ("DVD") drive, a ZIP drive, or a Superdisk, to be connected to or disconnected from the IDE-bus extension 129 of a fully operational computer 100.

Operation of the analog multiplexer 412 is enabled or disabled by a signal coupled from a multiplexer control 414 included in the audio-interface IC 102. The multiplexer control 414 transmits the control signal to the transmission gates 402 and 406 via a transmission-gate-control signal-line 416. For disabling operation of the analog multiplexer 412, the multiplexer control 414 receives software data via the SMBus 162. For enabling operation of the analog multiplexer 412, the multiplexer control 414 may receive either or both a hardware signal via a touchdown signal-line 418 and/or software data via the SMBus 162. The multiplexer control 414 also receives signals from the state machine 202 via a multiplexer-control-signal selection-bus 422. Signals supplied to the multiplexer control 414 from the state machine 202 via the multiplexer-control-signal selection-bus 422 determine whether operation of the multiplexer control 414 is enabled by the signal supplied via the touchdown signal-line 418, or by data supplied to the multiplexer control 414 via the SMBus 162.

Accordingly, as illustrated in FIG. 3 the register block 208 of the audio-interface IC 102 which employs the preferred analog multiplexer 412 includes a software programmable bit 208$ca3$ located in the low-order byte of the Electrical Power Register 208$c$. Setting bit 208$ca3$ activates software data control of the multiplexer control 414 via the SMBus 162, while resetting bit 208$ca3$ activates hardware enablement of the multiplexer control 414 via the touchdown signal-line 418. To effect software disabling and enabling of the multiplexer control 414, the low-order byte of the Electrical Power Register 208$c$ also includes a software programmable bit 208$ca2$ which if set enables operation of the transmission gates 402 and 406. Conversely, resetting bit 208$ca2$ disables operation of the transmission gates 402 and 406.

When the computer 100 is fully operational with a device connected to the IDE-bus extension 129, using one of the manual input devices 112 a user of the computer 100 may direct a computer program executed by the CPU 120 to release the device connected to the IDE-bus extension 129. In response thereto, the computer 100 causes the analog multiplexer 412 to isolate the IDE-bus extension 129 from the remainder of the CD-ROM subsystem 106, and then mechanically releases the device so it may be physically removed from the computer 100. Upon subsequent insertion of a device into the computer 100 and connection of that device to the IDE-bus extension 129, the device becomes mechanically locked into the computer 100, and the audio-interface IC 102 responsive, either the hardware signal or software data, re-couples the IDE-bus extension 129 to the remainder of the CD-ROM subsystem 106 thereby restoring the computer 100 to full operation.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A computer system adapted to play audio CD-ROMs, said computer system comprising:

a computer subsystem comprising a system CPU and a digital computer bus;

and a CD-ROM subsystem comprising a CD-ROM drive capable of playing audio CDs; and an audio amplifier circuit coupled to said CD-ROM drive;

a controller selectively coupled to said CD-ROM drive and said audio amplifier, and adapted to generate signals to operate said CD-ROM drive and play said audio CDs when power is not being supplied to said computer subsystem, said controller comprising a host-bus interface adapted for coupling the controller to the digital computer bus of the computer subsystem, said host-bus interface comprising transmission gates to selectively couple or isolate said digital computer bus and said CD-ROM drive.

2. A system as claimed in claim 1, said computer subsystem further comprising a digital computer bus coupling said CPU and a digital-audio generating circuit; said CD-ROM subsystem further comprising an audio switch for selectively coupling said digital-audio generating circuit and said audio amplifier when said power is supplied to said computer subsystem, and for isolating said controller from said digital-audio generating circuit and said audio amplifier when said power is not being supplied to said computer subsystem.

3. A system as claimed in claim 1, wherein when said power is supplied to said computer subsystem, said controller being coupled to said digital computer bus and passing therethrough control signals to and from said CPU, said CD-ROM drive and said audio amplifier.

4. A system as claimed in claims 1, wherein said computer subsystem further comprises an SM-BUS controller, said controller comprises an SM-BUS communication interface circuit and said digital bus comprises an SM-BUS.

5. A system as claimed in claim 1, said computer subsystem further comprises a keyboard controller and said bus comprises a PCI bus, wherein said keyboard controller being selectively coupled to said controller when said power is supplied to said computer subsystem.

6. A system as claimed in claim 1, said computer subsystem further comprising a PCI bus controller, said controller further comprises a PCI communication interface and said bus is a PCI bus.

7. A system as claimed in claim 1, wherein said CD-ROM drive comprises an ATAPI-based device, and said signals generated by said controller to said CD-ROM comprise ATAPI signals.

8. A system as claimed in claim 1, further comprising one more interface switches for human control of said CD-ROM, said switches electrically coupled to said controller and generating signals to said controller and causing said controller to generate control signals for operation of said CD-ROM drive.

9. A system as claimed in claim 1, further comprising a display coupled to said controller for displaying the track number of said CD-ROM.

10. A system as claimed in claim 8, wherein said interface switches comprise buttons accessibly mounted on said computer system and electrically coupled to said controller so as to permit human control over said CD-ROM drive.

11. A system as claimed in claim 8, wherein activation of one of said interface switches, when said main power is not being supplied to said CPU, generates a signal to said controller thereby activating said controller.

12. A system as claimed in claim 10, wherein said buttons include functionality selected from the group of one or more of play, fast-forward, rewind, next track, previous track, pause and stop.

13. An integrated circuit (IC) operable to control a CD-ROM drive, said IC comprising:

a state machine for coupling and decoupling a computer CPU to a CD-ROM drive, said state machine adapted to control operation of said CD-ROM drive when said CPU is deenergized;

a PCI bus interface for exchanging commands and data with a PCI host interface controller along a PCI bus when said CPU is energized;

said state machine comprising a host-bus interface adapted for coupling the controller to the digital computer bus of the computer subsystem, said host-bus interface comprising transmission gates to selectively couple or isolate said digital computer bus and said CD-ROM drive.

14. An IC as claimed in claim 13, further comprising an SMBus interface for exchanging commands and data with an SMBus controller along an SMBus when said CPU is energized.

15. An IC as claimed in claim 13, further comprising an isolation switch for isolating said CPU from said CD-ROM drive when said CPU is deenergized.

16. An IC as claimed in claim 13, said state machine being further operable to control an audio amplifier coupled to said CD-ROM drive.

17. An IC as claimed in claim 13, further comprising buttons for controlling an audio CD loaded in said CD-ROM drive.

18. An IC as claimed in claim 13, further comprising display circuitry for displaying track data associated with an audio CD loaded into said CD-ROM drive.

* * * * *